Oct. 11, 1927.

R. POHL 1,645,070

DYNAMO ELECTRIC MACHINE

Filed Aug. 3, 1925

Inventor:
Robert Pohl,
by
His Attorney.

Patented Oct. 11, 1927.

1,645,070

UNITED STATES PATENT OFFICE.

ROBERT POHL, OF BERLIN, GERMANY, ASSIGNOR TO GENERAL ELECTRIC COMPANY, A CORPORATION OF NEW YORK.

DYNAMO-ELECTRIC MACHINE.

Application filed August 3, 1925, Serial No. 47,948, and in Germany August 23, 1924.

My invention relates to dynamo electric machines and particularly to the shielding of magnetic structural elements of dynamo electric machines in which it is undesirable to allow the penetration of a changing flux. It is usual in the construction of a revolving field type of alternating current machine, for example an alternator, to construct the stator core of a plurality of laminations placed one upon the other and clamped together by means of end-plates and throughbolts. These laminations are punched on the inner periphery with slots which carry the stator coils. The end-plates of cast iron or steel usually consist of a solid, thick portion adjacent the core body of the laminations, and fingers running along each tooth to impart a heavy pressure thereto when the armature is clamped together. The current in the stator winding subjects the fingers to continued magnetic flux reversals and since the end-plates and fingers are usually made of massive magnetic material comparatively heavy losses and heating occur therein owing to the formation of eddy currents.

The object of my invention is to reduce the heating and losses due to eddy currents in the magnetic structural elements of dynamo electric machines subject to a leakage flux, such as the end-plate fingers.

In accordance with my invention these losses are reduced by associating with the element to be protected a short-circuited conductor of high electrical conductivity.

Figure 1:
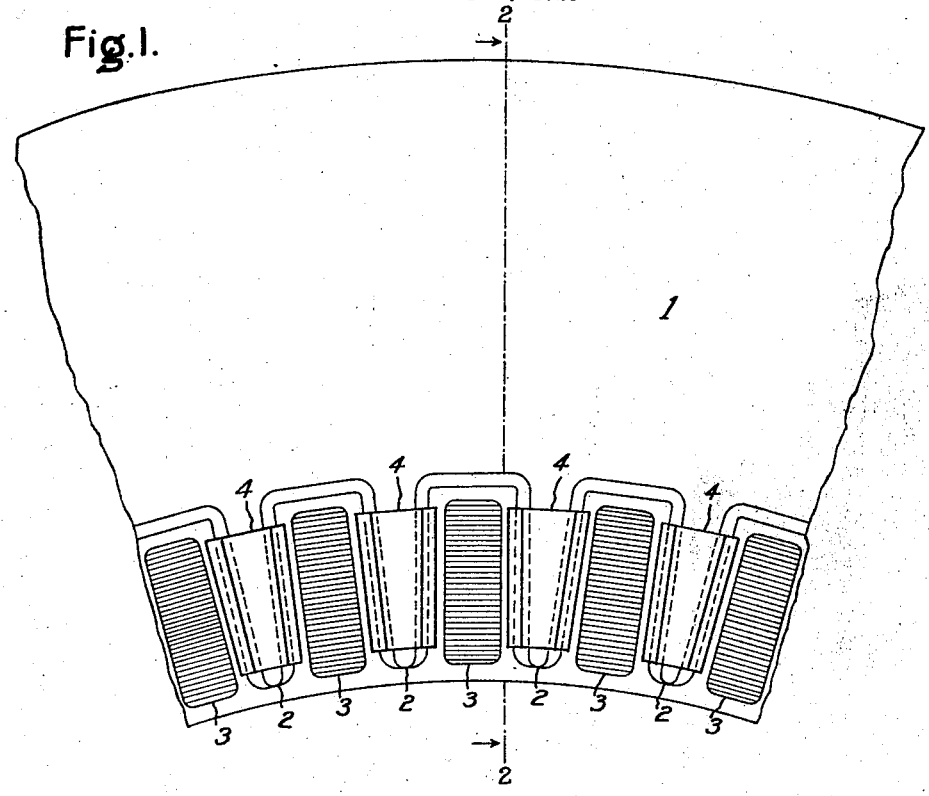
Figure 2:
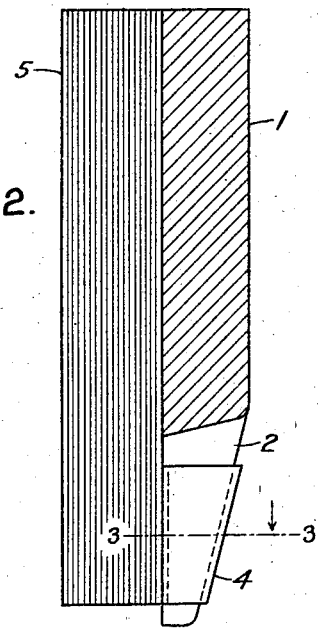

The novel features which I believe to be characteristic of my invention are set forth with particularity in the appended claims. For a better understanding of my invention, reference may be had to the following description taken in connection with the accompanying drawing in which Fig. 1 shows an embodiment of my invention in an endplate of a dynamo electric machine; Fig. 2 is a section on line 2—2 of Fig. 1, and Fig. 3 is a detailed section on line 3—3 of Fig. 2.

Referring to Fig. 1 of the drawing, 1 indicates an end-plate for the stator laminations of a dynamo electric machine, 2 indicates the end-plate fingers, and 3 the stator winding shown as conductors of flat bar copper. The clamping fingers are shown as surrounded by a shield 4 of non-magnetic conducting material of high electrical conductivity, for example copper, which is constructed to form a complete electrical circuit and entirely surround the fingers so as to constitute a short-circuited turn.

The induced voltage causing the flow of eddy current in the short-circuited turn is in lagging quadrature with respect to the inducing leakage magnetic flux of the stator conductors, and since the path of the eddy currents is of very low resistance, its impedance is mostly composed of the reactance component and the eddy currents are lagging nearly in quadrature with the induced voltage. Under these circumstances, the eddy currents are nearly 180 degrees out of phase with the impressed magnetic force, and their magnetic force is therefore nearly in opposition to the impressed magnetic force. These short-circuited turns thereby prevent the leakage magnetic flux from penetrating into the magnetic element to be protected.

Figure 3:
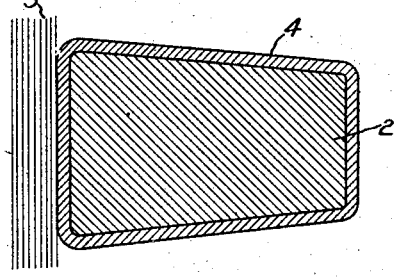

In Figs. 2 and 3 a part of the stator core is indicated at 5 with the end-plate in position and the end-plate fingers with the short-circuited turn shown in more detail. The surrounding copper sleeve may be secured to the fingers by any convenient means to prevent displacement and should be of sufficiently large cross section to carry the demagnetizing ampere turns without overheating. While I prefer to use a winding comprising a copper sleeve of a single turn, various modifications to obtain a short-circuited winding comprising one or more turns of high electrical conductivity will occur to those skilled in the art, and may be used, if preferred, without departing from my invention in its broader aspects.

Although an embodiment of my invention has been shown in connection with the end-plate fingers of an alternating current machine, it is apparent that it may be used in connection with other structural magnetic elements subject to eddy current losses due to their proximity to heavy current conductors. In every case it is essential for the object of the invention that the elements to be protected should be associated with a shield of any suitable form made of material having a high electrical conductivity and of suitable cross section, forming short-circuited turns in such a way to link the leakage flux tending to traverse the magnetic element and prevent the penetration of the magnetic field into the part to be protected and thus avoid the losses due to eddy currents set up by a changing leakage magnetic flux.

What I claim as new and desire to secure by Letters Patent of the United States, is:

1. A slotted core structure for an alternating current dynamo electric machine having end-plates comprising magnetic end-plate fingers, a short circuited winding of high electrical conductivity associated with said fingers and positioned to link the leakage flux tending to traverse said fingers.

2. A slotted core structure for an alternating current dynamo electric machine having end-plates comprising end-plate fingers slotted to conform to the slots in said core, and a short-circuited winding of high electrical conductivity surrounding said fingers.

3. A slotted core structure for an alternating current dynamo electric machine having end-plates comprising end-plate fingers slotted to conform to the slots in said core, and a copper sleeve surrounding said fingers.

In witness whereof, I have hereunto set my hand this 15th day of July, 1925.

ROBERT POHL.